(12) United States Patent
Hull et al.

(10) Patent No.: US 12,374,981 B2
(45) Date of Patent: Jul. 29, 2025

(54) SUPERCONDUCTOR JOINING AND JOINTS (71) Applicants: THE BOEING COMPANY, Arlington, VA (US); Cambridge Enterprise Limited, Cambridge (GB)

(72) Inventors: John R. Hull, Sammamish, WA (US); John Hay Durrell, Cambridge (GB); Jasmin Vivien Joan Congreve, Cambridge (GB)

(73) Assignee: THE BOEING COMPANY, Arlington, VA (US)

( * ) Notice: Subject to any disclaimer, the term of this patent is extended or adjusted under 35 U.S.C. 154(b) by 308 days.

(21) Appl. No.: 18/193,306

(22) Filed: Mar. 30, 2023

(65) Prior Publication Data

US 2024/0333119 A1 Oct. 3, 2024

(51) Int. Cl.
*H02K 55/00* (2006.01)
*H02K 5/22* (2006.01)
*H02K 15/06* (2006.01)

(52) U.S. Cl.
CPC .......... *H02K 55/00* (2013.01); *H02K 5/22* (2013.01); *H02K 15/06* (2013.01)

(58) Field of Classification Search
CPC .......... H02K 15/00; H02K 15/06; H02K 5/00; H02K 5/22; H02K 55/00; H02K 55/04; H01F 6/00; H01F 6/005; H01F 6/04; H01F 6/06
See application file for complete search history.

(56) References Cited

U.S. PATENT DOCUMENTS

| | | | | |
|---|---|---|---|---|
| 3,742,265 A | | 6/1973 | Smith | |
| 3,904,901 A | * | 9/1975 | Renard | H02K 55/04 310/52 |
| 5,250,861 A | * | 10/1993 | Cummins | H02K 55/02 310/104 |
| 2020/0411219 A1 | | 12/2020 | Hull et al. | |

FOREIGN PATENT DOCUMENTS

| | | |
|---|---|---|
| EP | 0508936 A1 | 10/1992 |
| EP | 2523322 A3 | 4/2016 |
| EP | 2001121 B1 | 11/2016 |
| KR | 20170050551 A | 5/2017 |

(Continued)

OTHER PUBLICATIONS

Bumby, Chris W. et al., "Development of a brushless HTS exiter for 10KW HTS synchronous generator," Superconductor Science and Technology, vol. 29, 2016, pp. 1-11.

(Continued)

*Primary Examiner* — Tran N Nguyen
(74) *Attorney, Agent, or Firm* — Moore IP Law (57) ABSTRACT

Superconducting joints and methods of forming the same are described. A particular method includes arranging two or more terminals relative to one another and to one or more interconnect layers, wherein each terminal includes bulk high-temperature superconductive material and each terminal is coupled to at least one end of one or more high-temperature superconductive tapes. The method also includes heating the one or more interconnect layers to form a high-temperature superconductive electrical connection between the two or more terminals.

22 Claims, 4 Drawing Sheets

(56) References Cited

FOREIGN PATENT DOCUMENTS

| WO | 2013012823 A3 | | 5/2013 |
| WO | WO2017043555 A1 | * | 3/2017 |
| WO | WO2019044783 A1 | * | 3/2019 |

OTHER PUBLICATIONS

Congreve J V J, et al., "A reliable technique to fabricate superconducting joints between single grain, Y—Ba—Cu—O bulk superconductors," Superconductor Science and Technology, vol. 34, 2021, pp. 1-9.

Jin, Xinzhe et al., "Development of a superconducting joint between a GdBa2Cu3O7-coated conductor and YBa2Cu3O7-bulk: towards a superconducting joint between RE (Rare Earth) Ba2Cu3O7-coated conductors," Superconductor Science and Technology, vol. 28, 2015, pp. 1-7.

Kato, J. Y. et al., "Diffusion joint of YBCO coated conductors using stabilizing silver layers," Physica C, vol. 445-448, 2006, pp. 686-688.

Kulikov, I. V. et al., "A Superconducting Joint for 2G HTS Tapes," Technical Physics Letters, 2019, vol. 45, No. 4, pp. 324-236.

Namburi, Devendra K., et al., "The processing and properties of bulk (RE)BCO high temperature superconductors: current status and future perspectives," Superconductor Science and Technology, No. 34, 2021, pp. 1-52.

SuperPower, Inc., "Superior Wire for Many Applications," retrieved Jul. 20, 2023, https://www.furukawa.co.jp/en/, pp. 1-4.

\* cited by examiner

SUPERCONDUCTOR JOINING AND JOINTS

FIELD OF THE DISCLOSURE

The present disclosure is generally related to joining of superconductors and devices that include joints between superconductors.

BACKGROUND

A great deal of research has been focused on developing materials that operate as superconductors. As used herein, a material is a "superconducting material" if the material is capable of superconducting when cooled below a material-specific temperature (referred to herein as the superconducting threshold temperature of the material). The properties of superconducting materials make them very appealing for many applications; however, there are many challenges with using superconducting materials. One such challenge is that such materials require cooling to enter and remain in a superconducting regime (i.e., below the superconducting threshold temperature of the material). Even so-called high-temperature superconductors generally need to be cooled well below ambient temperatures. For example, as used herein, "high-temperature" superconducting materials have a superconducting threshold temperature above 90 Kelvin (K). Accordingly, any system that uses superconducting materials generally requires refrigeration, and the refrigeration equipment can offset some of the benefit of using superconducting materials. For example, the specific power of motors and generators can be improved by use of superconducting materials with high current density. However, when weight is a factor, using superconducting materials can be challenging because cooling these materials sufficiently for superconductive operation generally requires use of large, heavy refrigeration equipment.

Another challenge associated with using superconducting materials in some contexts is that it can be much more complicated to form joints between superconducting materials than to form joints using conventional conductors, such as copper, aluminum, or other metals. These complications are due to multiple factors. For example, it is often much more complicated to arrange a high-temperature (HT) superconducting material into a desired physical arrangement than it would be to shape a conventional conductor, since most known HT superconducting materials are inflexible, brittle solids. The challenge of physically arranging HT superconducting materials can be partially addressed by using a so-called "coated conductor", which is a semi-flexible (i.e., flexible in some directions) tape structure that includes a layer of a HT superconducting material and one or more coating layers to protect the HT superconducting material. However, using coated conductors is itself challenging since it is difficult to form superconducting joints between two coated conductors or between a coated conductor and another component. If such joints are not superconducting, they will introduce resistive heating, which will increase the refrigeration required for superconducting operation of the coated conductor and other components.

Additionally, available processes for forming superconducting joints between coated conductors and other components are complex. For example, such processes generally require careful control of temperatures and pressure applied to the components being joined. Further, even after the components are joined, follow-on processes may be needed to make the joint superconducting. To illustrate, heating required to form the joint may cause oxygen depletion in a region around the joint, and the joint may be subjected to a re-oxygenation process to mitigate the oxygen depletion in order to make the material of the joint superconductive. Such joining and re-oxygenation processes can take many hours or days, require careful control, and are often performed in a cleanroom environment to limit sources of contamination. Further, these joining and re-oxygenation processes would be even further complicated in the situation where components (e.g., two coated conductors) needed to be joined while disposed in a desired physical arrangement. To illustrate, joining two ends of a coated conductor to form a desired closed-coil shape would entail all of the above challenges and would also introduce challenges with retaining the coated conductor in the desired shape throughout each of the process stages.

SUMMARY

According to a particular aspect, a device includes a first terminal including a first bulk high-temperature superconductive material coupled to a first end of a high-temperature superconductive tape. The device includes a second terminal including a second bulk high-temperature superconductive material coupled to a second end of the high-temperature superconductive tape. The device also includes an interconnect layer configured to couple the first terminal and the second terminal to form a high-temperature superconductive electrical connection between the first terminal and the second terminal.

According to another particular aspect, a device includes a first terminal including a first bulk high-temperature superconductive material coupled to a first end of a first high-temperature superconductive tape. The device includes a second terminal including a second bulk high-temperature superconductive material coupled to a first end of a second high-temperature superconductive tape. The device also includes an interconnect layer configured to couple the first terminal and the second terminal to form a high-temperature superconductive electrical connection between the first terminal and the second terminal.

According to another particular aspect, a method includes arranging two or more terminals relative to one another and to one or more interconnect layers, wherein each terminal includes bulk high-temperature superconductive material and each terminal is coupled to at least one end of one or more high-temperature superconductive tapes. The method also includes heating the one or more interconnect layers to form a high-temperature superconductive electrical connection between the two or more terminals.

The features, functions, and benefits described herein can be achieved independently in various implementations or may be combined in yet other implementations, further details of which can be found with reference to the following description and drawings.

DETAILED DESCRIPTION

An improved HT superconductive joint is disclosed herein, as well as devices that include the improved HT superconductive joint and techniques for forming the improved HT superconductive joint. Use of the disclosed techniques simplifies formation of circuits and/or components that include HT superconductive materials with HT superconductive joints therebetween and enables formation of HT superconductive joints in the field (e.g., outside of ultraclean laboratories and cleanroom environments).

In a particular aspect, one or more HT superconductive tapes are processed to add terminals. Each of the terminals is formed by coupling a superconductive material of a layer of the HT superconductive tape to a piece of a bulk HT superconductive material via a superconductive joint. In some implementations, operations to couple the HT superconductive tape to the bulk HT superconductive material can be performed in a highly controlled environment using specialized equipment. After the terminals are formed, the HT superconductive tape with the terminals can be arranged in a desired physical configuration. For example, a single length of HT superconductive tape having a terminal on each end can be arranged to form a closed-loop coil. As another example, two or more HT superconductive tapes can be arranged relative to one another to form a longer length of HT superconductive tape. An interconnect layer is disposed between the two or more terminals of the HT superconductive tape(s) and is used to join the bulk HT superconductive material of the terminals together to form a superconductive joint. Formation of superconductive joints between two pieces of bulk HT superconductive material is a beneficially simpler process (e.g., does not require removal of one or more protective layers to expose a superconductive material layer, uses less heat, less pressure, or combinations thereof) than formation of a superconductive joint between two ends of HT superconductive tape or between an end of a HT superconductive tape and a piece of bulk HT superconductive material. In particular, formation of superconductive joints between two pieces of bulk HT superconductive material can be performed "in the field" (e.g., in a less strictly controlled environment than a laboratory or cleanroom), which greatly simplifies incorporation of HT superconductive materials into ordinary manufacturing and/or repair processes.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1A:
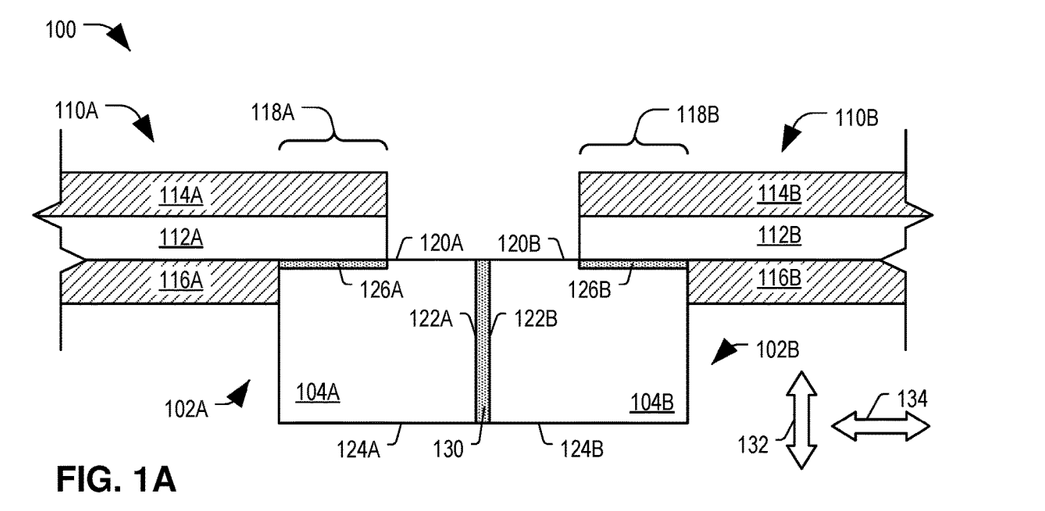
FIG. 1A is a diagram illustrating a first example of a joint physically and electrically coupling ends of one or more high-temperature superconductive tapes together via terminals that include bulk high-temperature superconductive material.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple terminals are illustrated and associated with reference numbers 102A and 102B. When referring to a particular one of these terminals, such as the terminal 102A, the distinguishing letter "A" is used. However, when referring to any arbitrary one of these terminals or to these terminals as a group, the reference number 102 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1A and FIG. 1B each depict a joint 100 coupling one or more HT superconductive tapes 110, which indicates that in some implementations the joint 100 includes a single HT superconductive tape 110 (e.g., in which opposite ends of the same HT superconductive tape 110 are joined to form a closed loop) and in other implementations the joint 100 includes multiple HT instances of superconductive tape 110 (e.g., in which an end of one HT superconductive tape 110 is joined to an end of another HT superconductive tape 110 via a terminal). For ease of reference herein, such features are generally introduced as "one or more" features, and are subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1A is a diagram illustrating a first example of a joint 100 physically and electrically coupling ends 118 of one or more HT superconductive tapes 110 together via terminals 102 that include bulk HT superconductive material 104. In particular, FIG. 1A illustrates an end 118A of HT superconductive tape 110A coupled to an end 118B of HT superconductive tape 110B via the joint 100. In some implementations, the ends 118A and 118B are opposite ends of a single HT superconductive tape 110 (i.e., HT superconductive tape 110A and HT superconductive tape 110B are part of one HT superconductive tape 110). For example, in such implementations, the ends 118 of the HT superconductive tape 110 may be joined together (via the joint 100) to form a closed-loop. In other implementations, the HT superconductive tape 110A and HT superconductive tape 110B are distinct. In such implementations, the ends 118 of the HT superconductive tapes 110 are joined together (via the joint 100) to form a superconductive current path of greater length than either of the individual HT superconductive tapes 110A, 110B alone.

In a particular aspect, each of the HT superconductive tape(s) 110 includes or corresponds to a coated conductor. In this context, a "coated conductor" refers to a structure that includes at least a layer 112 of a superconductive material coupled to one or more protective layers 114, 116 and configured to be at least semi-flexible while retaining superconductive properties. The coated structure may have a ribbon or a tape form factor or some other form factor. In general, commercially available coated conductors (such as the 2G HTS wire available from SuperPower Inc. of Glenville, NY) include a substrate onto which a thin (e.g., on the order of a micrometer or a few micrometers) layer of a superconductive material is deposited corresponding to the layer 112 of FIG. 1A. The substrate and the layer of superconductive material are then covered (e.g., via sputtering, electroplating, another deposition technique, or combinations thereof) with the one or more protective layers 114, 116, such as a silver layer, a copper layer, or a layer of some other material. In some implementations, coated conductors also include other layers, such as buffer layers or seed layers used to facilitate various manufacturing steps, etc. The ribbon-like structure of a coated conductor allows the coated conductor to be manipulated into various shapes, such as coils, curves, and so forth.

Figure 5A:
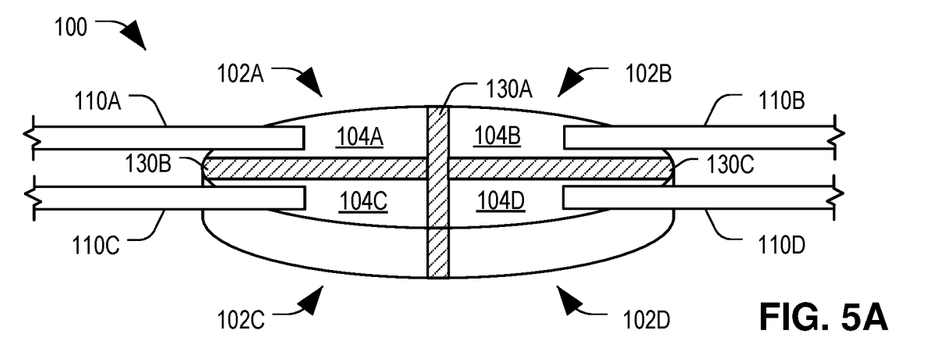
FIG. 5A is a diagram illustrating another example of a joint physically and electrically coupling ends of one or more high-temperature superconductive tapes together via terminals that include bulk high-temperature superconductive material.

In a particular aspect, the bulk HT superconductive material 104 of each terminal includes a crystalline rare-earth barium copper oxide ("(RE)Ba—Cu—O" or simply "(RE) BCO"), where the rare-earth element ("RE") corresponds to any rare earth element, such as yttrium ("Y"), lanthanum ("La"), samarium ("Sm"), or gadolinium ("Gd"). In some implementations, the bulk HT superconductive material 104 of each terminal 102 corresponds to a single crystal (e.g., a single grain) of the (RE)BCO material. In some such implementations, the terminals 102 are cut from a single crystal. For example, in FIG. 1A, two terminals 102A and 102B are illustrated. In this example, the bulk HT superconductive material 104 of the two terminals 102A and 102B is grown as a single crystal, which is cut into two portions to form the terminals 102A, 102B (as described further with reference to FIG. 5). However, in other implementations, two or more distinct crystals of the bulk HT superconductive material 104 are grown and used to form the terminals 102A, 102B.

In FIG. 1A, the end 118A of the HT superconductive tape 110A is coupled to the bulk HT superconductive material 104A via an interface layer 126A, and the end 118B of the HT superconductive tape 110B is coupled to the bulk HT superconductive material 104B via an interface layer 126B. The material used to form the interface layers 126 is selected to be compatible with materials of the HT superconductive tape(s) 110 and the bulk HT superconductive material(s) 104, to provide a high critical current density (Jc) HT superconducting connection, and to be compatible with processing operations used to couple the terminals 102. In some implementations, the material of the interface layer 126 is derived from the HT superconductive tape 110, from the bulk HT superconductive material 104, or both. For example, the HT superconductive tape 110 can be coupled to the bulk HT superconductive material 104 using operations that merge or intermingle portions of the layer 112 of superconductive material of the HT superconductive tape 110 and portions of the bulk HT superconductive material 104, such as melt processing operations, solid-state diffusion operations, etc. In some implementations, the interface layer 126 includes a solder (e.g., a Yb-123 solder), a YBCO precursor powder, or another material to facilitate physical and electrical connection between the HT superconductive tape 110 and the bulk HT superconductive material 104.

As one example of forming the terminal 102A illustrated in FIG. 1A, at least a portion of the protective layer 116A proximate the end 118A is removed (e.g., using chemical and/or mechanical processes) to expose a portion of the layer 112A of superconductive material of the HT superconductive tape 110A. At least the exposed portion of the layer 112A and at least a portion of a surface 120A of the bulk HT superconductive material 104A are processed to provide smooth and clean bonding surfaces. A material including YBCO, and possibly other constituents (e.g. silver), in appropriate proportions is disposed on one or both of the bonding surfaces. Heat and pressure are applied sufficient to melt at least the YBCO, after which the materials are allowed to cool sufficiently to solidify the YBCO to form a precursor layer of the interface layer 126A. At least the precursor layer and adjacent portions of the HT superconductive tape 110A and the bulk HT superconductive material 104A are subjected to a re-oxygenation process to introduce oxygen into the crystal structure of the precursor layer and adjacent portions of the HT superconductive tape 110A and the bulk HT superconductive material 104A. Introduction of the oxygen facilitates conversion of crystal structures of the precursor layer and adjacent portions of the HT superconductive tape 110A and the bulk HT superconductive material 104A to an orthorhombic structure, which is associated with superconductive properties.

In some implementations, the terminal 102B illustrated in FIG. 1A is formed in the same manner as described above for the formation of the terminal 102A. In other implementations, the terminals 102A, 102B are formed using different processes, but in a manner that enables the terminals 102A, 102B to be joined using an appropriate interconnect layer 130 to form a HT superconducting joint (e.g., the joint 100).

The interconnect layer 130 is configured to couple the terminals 102A, 102B to form a HT superconductive electrical connection therebetween. Additionally, material of the interconnect layer 130 is selected to enable forming the HT superconductive electrical connection between the terminals 102 without damaging the interface layer 126, the HT superconductive tape 110, or the bulk HT superconductive material 104. For example, in a particular implementation, the layer 112 of each of the HT superconductive tape(s) 110 has a peritectic temperature greater than or equal to a first value, material of the interface layer(s) 126 have a peritectic temperature greater than or equal to a second value, the bulk HT superconductive material(s) 104 have a peritectic temperature greater than or equal to a third value, and the material of the interconnect layer 130 has a peritectic temperature greater than or equal to a fourth value, where the fourth value is less than the first value, less than the second value, and less than the third value. In this example, heat applied to melt the interconnect layer 130 to join the terminals 102 is not sufficient to damage superconductive properties of other materials of the joint 100. In some implementations, cooling is applied to end regions of the superconductive tapes(s) 110A, 110B during formation of the interconnect layer 130 between the terminals 104A, 104B to ensure that the process for connecting the terminals 104A, 104B together via the interconnect layer 130 does not adversely affect connections of the superconductive tape(s) 110A, 110B to the terminals 104A, 104B.

In a particular implementation, the interconnect layer 130 includes a layer of a YBCO-Ag material. As one example of forming the interconnect layer 130, powders of Y-123:Y-211:CeO2:Ag2O in the mass ratio 150:50:1:20 can be subjected to a liquid-phase-enriched top-seed melt growth (LR TSMG) process to grow a crystalline structure including YBCO-Ag. In this example, liquid-phase-enriched (LR) powder of Yb2O3:Ba3Cu5O8:BaO2 in the mass ratio 5.0: 5.6:1.0 can be used. In this example, the YBCO-Ag crystalline structure can be cut to form a thin (e.g., on the order of less than a millimeter to a few millimeters, such as 1 to 1.5 millimeters) YBCO-Ag layer, which is used as the interconnect layer 130. A YBCO-Ag layer formed in this manner has a lower peritectic temperature than bulk RE(BCO) materials (e.g., the bulk HT superconductive material 104), and thus can be heated sufficiently to form the joint 100 without damaging (e.g., altering the crystalline structure of) the bulk HT superconductive material 104.

RE(BCO) materials (and other bulk superconductors) exhibit anisotropic conduction properties. For example, critical current density of a superconductive material is often greater in a particular direction (e.g., direction 134) relative to the crystalline structure than in another direction (e.g., direction 132). In the example of FIG. 1A, the HT superconductive tape 110A is coupled to a first surface 120A of the bulk HT superconductive material 104A, a second surface 122A of the bulk HT superconductive material 104A is coupled, via the interconnect layer 130 to the bulk HT superconductive material 104B, and the second surface 122A is adjacent to the first surface 120A. Likewise, in the example of FIG. 1A, the HT superconductive tape 110B is coupled to a first surface 120B of the bulk HT superconductive material 104B, a second surface 122B of the bulk HT superconductive material 104B is coupled, via the interconnect layer 130 to the bulk HT superconductive material 104A, and the second surface 122A is adjacent to the first surface 120A. In this example, the first surface 120A is approximately parallel to the direction 134.

Although not required, the arrangement illustrated in the example of FIG. 1A may be appropriate when the crystalline structure of the bulk HT superconductive material(s) 104 are arranged such that anisotropic conductive properties of the bulk HT superconductive material(s) 104 are more favorable along the direction 134 than along the direction 132. To illustrate, in some implementations, the bulk HT superconductive material(s) 104 exhibit a first critical current density in a first plane parallel that is to the direction 134 (e.g., parallel to the first surface(s) 120) and a second critical current density along the direction 132 perpendicular to the first plane, where the first critical current density is greater than the second critical current density. In such implementations, the arrangement illustrated in the example of FIG. 1A may provide greater critical current density than, for example, the arrangement illustrated in the example of FIG. 1B.

Figure 1B:
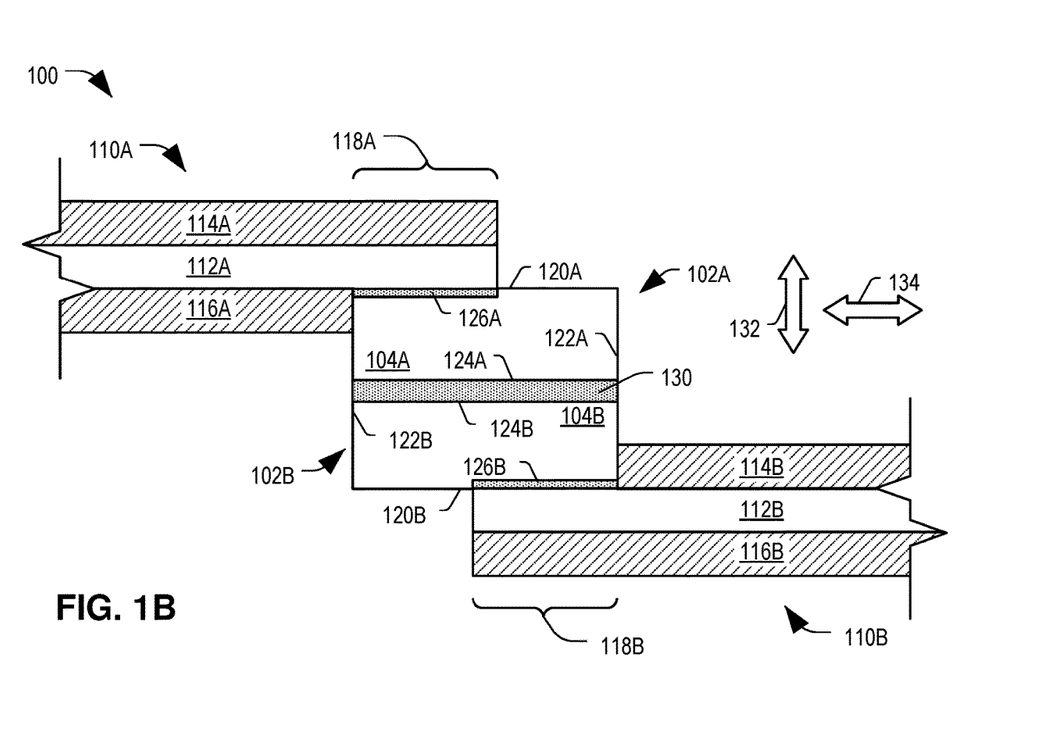
FIG. 1B is a diagram illustrating a second example of a joint physically and electrically coupling ends of one or more high-temperature superconductive tapes together via terminals that include bulk high-temperature superconductive material.

The example of FIG. 1B is identical to the example illustrated in FIG. 1A (and can be formed using the same operations described above) except that in the example illustrated in FIG. 1B, the HT superconductive tape 110A is coupled to the first surface 120A of the bulk HT superconductive material 104A, a third surface 124A of the bulk HT superconductive material 104A is coupled, via the interconnect layer 130 to the bulk HT superconductive material 104B, and the third surface 124A is opposite to the first surface 120A. Further, in the example of FIG. 1B, the HT superconductive tape 110B is coupled to the first surface 120B of the bulk HT superconductive material 104B, a third surface 124B of the bulk HT superconductive material 104B is coupled, via the interconnect layer 130 to the bulk HT superconductive material 104A, and the third surface 124A is opposite to the first surface 120. In this example, a primary direction of current flow is along the direction 132, in which the bulk HT superconductive material(s) 104 exhibit less favorable conductive properties (e.g., lower critical current density). However, the joint 100 of FIG. 1B may nevertheless be preferred over the joint 100 of FIG. 1A for manufacturability reasons, or other reasons besides the particular anisotropic conductive properties that characterize the joints 100 of FIGS. 1A and 1B. To illustrate, in some cases, the less favorable conductive properties, such as critical current density, may be sufficient for the intended use of the joint 100 while being easier to form due to positions or orientations of the ends 118 of the HT superconductive tape 110 during the joint formation step of a manufacturing process.

Figure 5B:
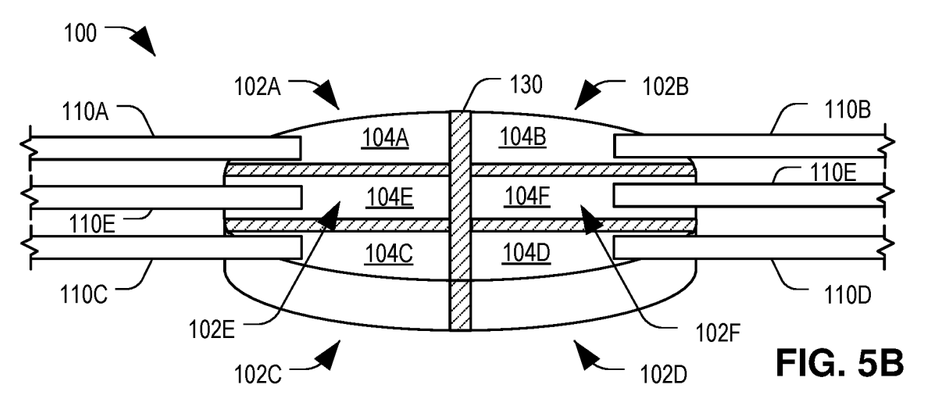
FIG. 5B is a diagram illustrating another example of a joint physically and electrically coupling ends of one or more high-temperature superconductive tapes together via terminals that include bulk high-temperature superconductive material.
Figure 5C:
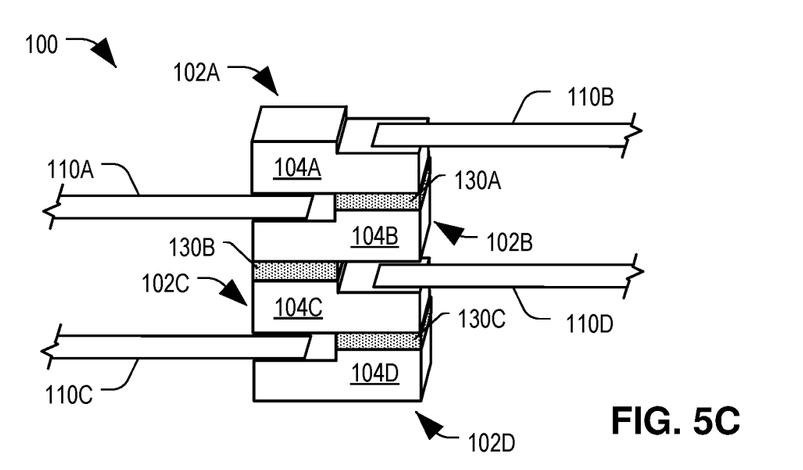
FIG. 5C is a diagram illustrating another example of a joint physically and electrically coupling ends of one or more high-temperature superconductive tapes together via terminals that include bulk high-temperature superconductive material.

Although FIGS. 1A and 1B illustrate examples in which two terminals 102 are used to form a joint 100 between two ends 118 of one or more HT superconductive tapes 110, in other implementations, such as implementations illustrated in FIGS. 5A, 5B, and 5C, more than two ends 118 can be joined using the operations described above. One technical benefit of the joint 100 is that the terminals 102 can be formed (e.g., by joining the HT superconductive tape(s) 110 to portions of bulk HT superconductive material(s) 104 in a separate operation from forming the joint 100 between the terminals 102. Since coupling the HT superconductive tape (s) 110 to the bulk HT superconductive material(s) 104 generally requires more complex processing than joining the terminals 102, separating the operations to join the HT superconductive tape(s) 110 to the bulk HT superconductive material(s) 104 from operations to join the bulk HT superconductive material(s) 104 via the interconnect layer 130 enables HT superconducting joints to be formed in a greater variety of processing conditions and environments. To illustrate, final operations to form the joint 100 can be performed "in the field", such as on a typical manufacturing line, rather than in a cleanroom. This improved ease of manufacturing beneficially enables use of HT superconducting joints in a larger variety of products at a lower production cost than is obtainable if all connections of the joints were formed in cleanroom environments.

Figure 2:
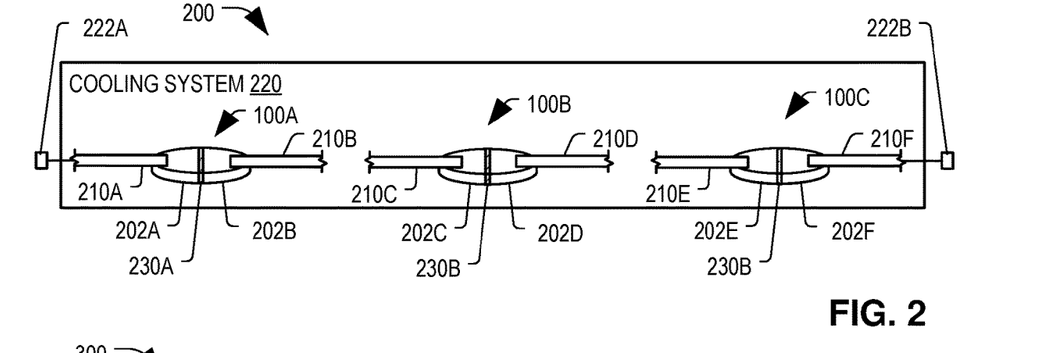
FIG. 2 is a diagram illustrating an example of a power transmission line that includes at least one joint physically and electrically coupling ends of high-temperature superconductive tape together via terminals that include bulk high-temperature superconductive material.

FIG. 2 is a diagram illustrating an example of a power transmission line 200 that includes at least one joint 100 physically and electrically coupling ends of HT superconductive tapes 210 together via terminals 202 that include bulk HT superconductive material. In the example illustrated in FIG. 2, an HT superconductive tape 210A is coupled via a joint 100A to an HT superconductive tape 210B, an HT superconductive tape 210C is coupled via a joint 100B to an HT superconductive tape 210D, and an HT superconductive tape 210E is coupled via a joint 100C to an HT superconductive tape 210F. In some implementations, the HT superconductive tape 210B and the HT superconductive tape 210C correspond to a single length of HT superconductive tape; however, in other implementations, one or more additional lengths of HT superconductive tape (joined by additional joints 100 or by different types of joints) are disposed between the HT superconductive tape 210B and the HT superconductive tape 210C. Likewise, in some implementations, the HT superconductive tape 210D and the HT superconductive tape 210E correspond to a single length of HT superconductive tape; however, in other implementations, one or more additional lengths of HT superconductive tape (joined by additional joints 100 or by different types of joints) are disposed between the HT superconductive tape 210D and the HT superconductive tape 210E.

In FIG. 2, each of the joints 100A, 100B, and 100C is illustrated as an instance of the joint 100 of FIG. 1A; however, in other implementations, one or more of the joints 100A, 100B, 100C is an instance of the joint 100 of FIG. 1B. In FIG. 2, the joint 100A is formed by physically and electrically coupling an interconnect layer 230A to both a terminal 202A coupled to an end of the HT superconductive tape 210A and a terminal 202B coupled to an end of the HT superconductive tape 210B. Further, the joint 100B is formed by physically and electrically coupling an interconnect layer 230B to both a terminal 202C coupled to an end of the HT superconductive tape 210C and a terminal 202D coupled to an end of the HT superconductive tape 210D. Similarly, the joint 100C is formed by physically and electrically coupling an interconnect layer 230C to both a terminal 202E coupled to an end of the HT superconductive tape 210E and a terminal 202F coupled to an end of the HT superconductive tape 210F.

Each of the terminals 202 of FIG. 2 is an example of one of the terminals 102 of FIG. 1A or FIG. 1B. For example, each of the terminals 202 includes a bulk HT superconductive material (such as the bulk HT superconductive material 104). While each joint 100 in FIG. 2 is illustrated as coupling two terminals 202, in some implementations, one or more of the joints 100 of FIG. 2 can include more than two terminals 202, as described further with reference to FIGS. 5A-C.

Each of the interconnect layers 230 of FIG. 2 is an example of the interconnect layer 130 of FIG. 1A or FIG. 1B. For example, each of the interconnect layers 230 can include a bulk HT superconductive material modified to have a lower peritectic temperature than the peritectic temperature of the bulk HT superconductive material of the terminals 202. While each joint 100 in FIG. 2 is illustrated as including one interconnect layer 230, in some implementations, one or more of the joints 100 of FIG. 2 can include more than one interconnect layer 230, as described further with reference to FIGS. 5A-C.

The power transmission line 200 of FIG. 2 also includes a cooling system 220 to cool the HT superconductive tapes 210 and the joints 100 sufficiently to enable superconductive current flow between connectors 222A and 222B. Details of the cooling system 220 will depend on the specific implementations, such as a superconducting threshold temperature of the HT superconducting materials of the power transmission line 200, an environment in which the power transmission line 200 is to operate, a length of the power transmission line 200, etc. FIG. 2 illustrates a single cooling system 220 for simplicity; however, in some implementations, the power transmission line 200 can be supported by more than one cooling system 220. To illustrate, two or more of the power transmission lines 200 illustrated in FIG. 2 can be electrically connected to one another via superconducting joints (e.g., joints 100) or non-superconducting joints (e.g., via connectors 222). In this illustrative example, each section of superconducting power transmission line 200 can be associated with an independent cooling system 220.

One technical benefit of using the joints 100 to form the power transmission line 200 is that a superconducting power transmission line of any arbitrary length can be formed using less complex processing than would be used to join sections of HT superconducting tape 210 directly to one another since formation of joints directly between HT superconducting tape 210 either are not superconducting or require complex post-processing operations (such as re-oxygenation) and cleanroom type environments. In contrast, the operations to couple the terminals 202 to form the joints 100 can be performed "in the field", such as on a typical manufacturing line, rather than in a cleanroom, and do not require re-oxygenation and other complex post-processing operations to be superconducting.

Figure 3:
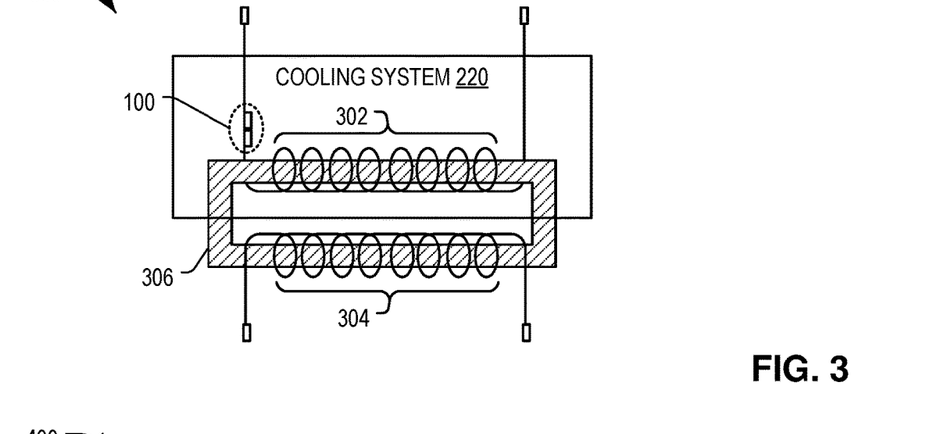
FIG. 3 is a diagram illustrating an example of a transformer that includes at least one joint physically and electrically coupling ends of high-temperature superconductive tape together via terminals that include bulk high-temperature superconductive material.

FIG. 3 is a diagram illustrating an example of a transformer 300 that includes at least one joint 100. For ease of illustration, the joint 100 is not shown in detail in FIG. 3; however, the joint 100 can include or correspond to the joint 100 of FIG. 1A, the joint 100 of FIG. 1B, or any of the joints 100 of FIGS. 5A-C. In particular, the joint 100 of FIG. 3 physically and electrically couples ends of two or more HT superconductive tapes (e.g., HT superconductive tape(s) 110 of FIGS. 1A and 1B) together via terminals (e.g., terminals 102 of FIGS. 1A and 1B) that include bulk HT superconductive material (e.g., bulk HT superconductive material 104 of FIGS. 1A and 1B).

In FIG. 3, the transformer 300 includes a first winding 302 and a second winding 304 arranged such that current flow in one of the windings induces a current flow in the other winding. The transformer 300 in FIG. 3 also includes a core 306 electromagnetically coupling the windings 302, 304. In other implementations, the transformer 300 includes more than two windings, includes windings arranged in a different manner, or both. For example, in some implementations, the transformer includes at least one third winding. Further, in some implementations, the core 306 is omitted from the transformer 300. Alternatively, in some implementations, the core 306 is arranged differently than illustrated in FIG. 3.

In the example illustrated in FIG. 3, the transformer 300 includes a cooling system 220 enclosing at least a portion of the first winding 302 to cool the joint 100 and the HT superconducting tapes joined via the joint 100 below a superconducting operation temperature. The joint 100 can be located anywhere along the HT superconducting tapes that form the first winding 302. Further, the first winding 302 can include more than one joint 100. In some implementations, the second winding 304 also includes one or more HT superconducting tapes, which may be joined using a second joint 100. In such implementations, the transformer 300 includes another cooling system at least partially enclosing the second winding 304 or the cooling system 220 extends to at least partially enclose the second winding 304 in addition to the first winding 302.

One technical benefit of using the joint 100 in the first winding 302 is that the joint 100 can be formed in a typical manufacturing environment. Thus, two or more lengths of HT superconducting tape can be arranged to form the first winding (e.g., wound about a portion of the core 306, and the joint 100 between two or more adjacent lengths of the HT superconducting tapes can be joined without the use of complex post-processing operations (such as re-oxygenation) and cleanroom type environments.

Figure 4:
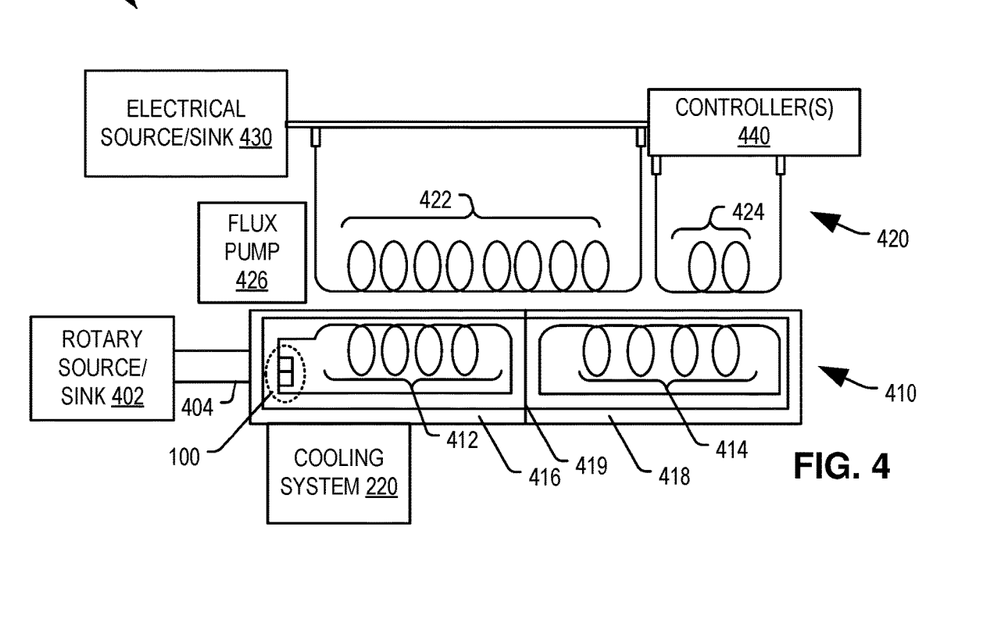
FIG. 4 is a diagram illustrating an example of a motor/generator that includes at least one joint physically and electrically coupling ends of high-temperature superconductive tape together via terminals that include bulk high-temperature superconductive material.

FIG. 4 is a diagram illustrating an example of a motor/generator 400 that includes at least one joint 100. For ease of illustration, details of the joint 100 are not shown in FIG. 4; however, the joint 100 can include or correspond to the joint 100 of FIG. 1A, the joint 100 of FIG. 1B, or any of the joints 100 of FIGS. 5A-C. In particular, the joint 100 of FIG. 4 physically and electrically couples ends of two or more HT superconductive tapes (e.g., HT superconductive tape(s) 110 of FIGS. 1A and 1B) together via terminals (e.g., terminals 102 of FIGS. 1A and 1B) that include bulk HT superconductive material (e.g., bulk HT superconductive material 104 of FIGS. 1A and 1B).

In this context, a "motor/generator" refers to a device configured to convert electrical energy into rotary motion (e.g., as a motor), to convert rotary motion into electrical energy (e.g., as a generator), or both (e.g., to operate as a motor in a first mode and as a generator in a second mode). In the example illustrated in FIG. 4, the motor/generator 400 is a hybrid wound-rotor motor/generator with induction feed and persistent current.

The motor/generator ("M/G") 400 is brushless and includes a rotor 410 and a stator 420. In FIG. 4, the M/G 400 is coupled to or includes an electrical source/sink 430, a rotary source/sink 402, and one or more controllers 440. The M/G 400 also includes a cooling system 220 coupled to or included within one or more portions of the rotor 410, and a flux pump 426 configured to induce and sustain a persistent current in a persistent-current superconducting coil 412 of the rotor.

The rotor 410 is coupled to a rotary source/sink 402 via a shaft 404. For example, when the M/G 400 is operating as a motor, motion of the rotor 410 is induced by a current in the stator 420 and is transferred, via the shaft 404, to turn the rotary source/sink 402. In another example, when the M/G 400 is operating as a generator, motion of the rotary source/sink 402 is transferred, via the shaft 404, to turn the rotor 410, motion of which induces a current in the stator 420.

In the example illustrated in FIG. 4, the rotor 410 includes one or more close-loop coils, such as a hybrid induction-fed coil 414 and the persistent-current superconducting coil 412. Including both the hybrid induction-fed coil 414 and the persistent-current superconducting coil 412 in the rotor 410 enables the M/G 400 to achieve high specific power and speed control. Additionally, the rotor 410 illustrated in FIG. 4 (e.g. including both the hybrid induction-fed coil 414 and the persistent-current superconducting coil 412) has low-inductance, is a high-current rotor that is easy to de-energize in case of a stator short, and can be used to decrease the voltage on the shorted stator during de-energizing of the rotor 410.

The flux pump 426 is configured to induce a current in the persistent-current superconducting coil 412 via a noncontact (e.g., electromagnetic) interaction. Generally, the flux pump 426 is used only, or primarily, during initial energizing of the M/G 400 and interacts with only a limited part of the windings of the rotor 410. As a result, inducing the current does not cause heating of the persistent-current superconducting coil 412, as may occur in some other induction process. In some implementations, the flux pump 426 can be operated in reverse to relatively quickly de-energize the windings of the rotor 410.

In a particular implementation, the hybrid induction-fed coil 414 is a conventional non-superconducting winding. A magnetic field from the hybrid induction-fed coil 414 is linked with the magnetic field from the windings of the stator 420. Under normal operation, the hybrid induction-fed coil 414 acts in tandem with the persistent-current superconducting coil 412 to increase the power of the M/G 400. If a short circuit occurs in the windings of the stator 420, the hybrid induction-fed coil 414 can act in opposition to the persistent-current superconducting coil 412 to cancel out all or part of the magnetic field going into the stator 420 to improve safety.

In FIG. 4, the windings of the stator 420 include a main stator coil 422 and a control stator coil 424. The persistent-current superconducting coil 412 is configured to interact only with the main stator coil 422. The control stator coil 424 is configured to interact only with the hybrid induction-fed coil 414. The hybrid induction-fed coil 414 is configured to interact with the main stator coil 422 and the control stator coil 424. The main stator coil 422 is configured to interact with both the persistent-current superconducting coil 412 and the hybrid induction-fed coil 414. In the example illustrated in FIG. 4, the main stator coil 422 and the control stator coil 424 are non-superconducting (and may not be coupled to the cooling system 220). In other implementations, the main stator coil 422, the control stator coil 424, or both, are superconducting and may be coupled to the cooling system 220 or to another cooling system. In implementations in which the main stator coil 422 is superconducting, the main stator coil 422 may include one or more joints 100. Likewise, in implementations in which the control stator coil 424 is superconducting, the control stator coil 424 may include one or more joints 100.

The rotor 410 of FIG. 4 is divided into two parts: a cold part 416 and a warm part 418. The two parts are separated by an insulating partition 419. The persistent-current superconducting coil 412 is located in the cold part 416 of the rotor 410, and the hybrid induction-fed coil 414 is located in the warm part 418 of the rotor 410.

In some implementations, the cooling system 220 is stationary (e.g., relative to the stator 420). In other implementations, the cooling system 220 or portions thereof are coupled to and move with the rotor 410. In such implementations, the cooling system 220 may be powered via inductive power transfer or in some other manner, such as via slip rings.

In some implementations, a portion of the persistent-current superconducting coil 412 interacts with the flux pump 426 to induce a persistent current into the persistent-current superconducting coil 412. When the persistent-current superconducting coil 412 electromagnetically interacts with the main stator coil 422, the persistent-current superconducting coil 412 acts as a constant source of magnetic flux.

The control stator coil 424 is configured to induce current into the hybrid induction-fed coil 414 in such a way that the hybrid induction-fed coil 414 either acts to reinforce the voltage produced in the main stator coil 422 by the persistent-current superconducting coil 412, acts against the voltage produced in the main stator coil 422 by the persistent-current superconducting coil 412, or acts to change the effective phase of the interaction.

In FIG. 4, the main stator coil 422 is connected to the electrical source/sink 430. The electrical source/sink 430 delivers power to the M/G 400 in a motor mode and receives power from the M/G 400 in a generator mode. In addition, the control stator coil 424 is connected to one or more controllers 440 to control the control stator coil 424.

One technical benefit of using the joint 100 in the windings of the rotor 410, the stator 420, or both, is that the joint 100 can be formed in a typical manufacturing environment. Thus, a length of HT superconducting tape can be arranged to form a first winding (e.g., a close-loop coil), and the joint 100 between the ends of the HT superconducting tapes without the use of complex post-processing operations (such as re-oxygenation) and cleanroom type environments.

FIG. 5A is a diagram illustrating another example of the joint 100 of FIG. 1A. In the example illustrated in FIG. 5A, the joint 100 physically and electrically couples ends of two or more HT superconductive tapes 110 together via terminals 102 that include bulk HT superconductive material 104. In particular, in FIG. 5A, the joint 100 couples a terminal 102A of an HT superconductive tape 110A, a terminal 102B of an HT superconductive tape 110B, a terminal 102C of an HT superconductive tape 110C, and a terminal 102D of an HT superconductive tape 110D.

The HT superconductive tapes 110 of FIG. 5A include at least two distinct HT superconductive tapes. For example, the HT superconductive tape 110A and the HT superconductive tape 110B illustrated in FIG. 5A may correspond to different ends of a single HT superconductive tape 110, and the HT superconductive tape 110C and the HT superconductive tape 110D illustrated in FIG. 5A may correspond to different ends of another single HT superconductive tape 110. In this example, the joint 100 physically and electrically joins the HT superconductive tapes 110 to form two closed loops. In another example, the HT superconductive tape 110A and the HT superconductive tape 110B illustrated in FIG. 5A may correspond to different ends of a single (e.g., a first) HT superconductive tape 110, the HT superconductive tape 110C may correspond to a different (e.g., a second) HT superconductive tape 110, and the HT superconductive tape 110D may correspond to another different (e.g., a third) HT superconductive tape 110. In still another example, each of the HT superconductive tapes 110A, 110B, 110C, 110D may correspond to a distinct HT superconductive tape 110. In this example, the HT superconductive tape 110A may correspond to a single (e.g., a first) HT superconductive tape 110, the HT superconductive tape 110B may correspond to another single (e.g., a second) HT superconductive tape 110, the HT superconductive tape 110C may correspond to yet another single (e.g., a third) HT superconductive tape 110, and the HT superconductive tape 110D may correspond to still another single (e.g., a fourth) HT superconductive tape 110.

In some implementations, the terminals 102 of FIG. 5A are formed from a single crystal of the bulk HT superconductive material 104. For example, a sample of the bulk HT superconductive material 104 can be cut into four pieces corresponding to the bulk HT superconductive material 104A of the terminal 102A, the bulk HT superconductive material 104B of the terminal 102B, the bulk HT superconductive material 104C of the terminal 102C, and the bulk HT superconductive material 104D of the terminal 102D. In other implementations, two or more of the terminals 102 of FIG. 5A are formed from different crystals of bulk HT superconductive material 104. For example, each of the four terminals 102A, 102B, 102C, and 102D shown in FIG. 5A can derive from a different crystal of bulk HT superconductive material 104. As another example, two or three of the terminals 102A, 102B, 102C, and 102D shown in FIG. 5A can derive from different crystals of bulk HT superconductive material 104.

In FIG. 5A, the terminals 102 are joined via interconnect layers 130A, 130B, and 130C. In some implementations, the interconnect layers 130 are formed of the same material, such as cut from a single YBCO-Ag crystal. In such implementations, the four terminals 102 illustrated in FIG. 5A are joined to one another at the same time (as distinct from being joined sequentially). To illustrate, the terminals 102 and interconnect layers 130 are arranged as illustrated in FIG. 5A, and heat and pressure is applied to at least partially melt the interconnect layers 130 such that the joint 100 is formed when the interconnect layers 130 recrystallize.

In other implementations, at least one of the interconnect layers 130 is formed of a different material than others of the interconnect layers 130. For example, the interconnect layer 130A may be formed from a first crystal formed using a first ratio of YBCO-Ag crystal, and the interconnect layers 130B and 130C may be formed from a second crystal formed using a second (different) ratio of YBCO-Ag crystal. In this example, the different ratios of materials are selected to form the interconnect layers 130 with different peritectic temperatures. For example, the interconnect layers 130B and 130C may have a higher peritectic temperature than the interconnect layers 130A. In this example, formation of the joint 100 of FIG. 5A can be performed in stages. To illustrate, the terminal 102A can be coupled to the terminal 102C by heating the interconnect layer 130B above its peritectic temperature while applying force to urge the terminals 102A and 102C toward one another. Likewise, the terminal 102B can be coupled to the terminal 102D by heating the interconnect layer 130C above its peritectic temperature while applying force to urge the terminals 102B and 102D toward one another. Subsequently, a terminal pair including the terminals 102A and 102C can be coupled to another terminal pair including the terminals 102B and 102D by heating the interconnect layer 130A above its peritectic temperature while applying force to urge the terminal pairs toward one another. In this illustrative example, the peritectic temperature of the interconnect layer 130A is sufficiently below the peritectic temperatures of the interconnect layer 130B and 130C that the heating to the peritectic temperature of the interconnect layer 130A does not disrupt the joint between the terminal 102A and 102C and does not disrupt the joint between the terminal 102B and 102D.

FIG. 5B is a diagram illustrating another example of the joint 100 of FIG. 1A. In the example illustrated in FIG. 5B, the joint 100 physically and electrically couples ends of more than two HT superconductive tapes 110 together via terminals 102 that include bulk HT superconductive material 104. The joint 100 of FIG. 5B illustrates one method of expanding the joint 100 of FIG. 5A. In particular, in FIG. 5B, the joint 100 couples a terminal 102E of an HT superconductive tape 110E between the terminals 102A and 102C of FIG. 5A and couples a terminal 102F of an HT superconductive tape 110F between the terminals 102B and 102D of FIG. 5A.

Like the terminals 102A-D, the terminals 102E and 102F are formed from bulk HT superconductive material 104 (e.g., bulk superconductive material 104E and 104F, respectively). The bulk superconductive material 104A-F of the terminals 102A-F can be derived from a single crystal or from different crystals, as described with reference to FIG. 5A. Further, the terminals 102 can be joined to one another in a single operation (e.g., using interconnect layers 130 with the same peritectic temperature), or sequentially. As one example of forming the joint 100 of FIG. 5B sequentially, in a first step, terminals 102A, 102E, and 102C can be coupled together; in a second step, terminals 102B, 102F, and 102D can be coupled to one another; and in a third step, terminals 102A, 102E, and 102C can be coupled to terminals 102B, 102F, and 102D. In other examples, interconnect layers 130 with appropriate peritectic temperatures can be used to enable joining the terminals 102 in any order to form the joint 100 of FIG. 5B.

FIG. 5B illustrates six terminals as merely one example. In other examples, any number of additional terminals can be added to the joint 100 of FIG. 5B by adjusting the geometry and arrangement of the terminals 102.

FIG. 5C is a diagram illustrating another example of the joint 100 of FIG. 1B. In the example illustrated in FIG. 5C, the joint 100 physically and electrically couples ends of two or more HT superconductive tapes 110 together via terminals 102 that include bulk HT superconductive material 104. In particular, in FIG. 5C, the joint 100 couples a terminal 102A of an HT superconductive tape 110A, a terminal 102B of an HT superconductive tape 110B, a terminal 102C of an HT superconductive tape 110C, and a terminal 102D of an HT superconductive tape 110D.

The terminals 102 of the joint 100 of FIG. 5C are arranged to form a vertical stack, in contrast, for example, to the joints 100 of FIGS. 5A and 5B in which the terminals are arranged horizontally. In other respects, the joint 100 is similar to the joint 100 of FIGS. 5A and 5B. For example, the HT superconductive tapes 110A-110D of FIG. 5C can include the same variety of materials and arrangements as described with reference to FIGS. 1A, 1B, 5A, and 5B. Likewise, the terminals 102A-102D of FIG. 5C can include the same variety of bulk HT superconductive materials 104 as described with reference to FIGS. 1A, 1B, 5A, and 5B. Further, the interconnect layers 130A-130C can include the same variety of materials as described with reference to FIGS. 1A, 1B, 5A, and 5B.

As described with reference to FIG. 1B, stacking the terminals 102 as illustrated in FIG. 1B and FIG. 5C can lead to somewhat reduced superconductive properties, such as a lower critical current density than the horizontal arrangements illustrated in FIGS. 1A, 5A, and 5B. However, other technical benefits can be achieved by the stacked arrangement in FIGS. 1B and 5C. For example, an HT superconductive tape 110 typically bends more readily in a direction normal to a face of the tape rather than in a direction parallel to the face of the tape. Accordingly, in some cases, it may be easier to arrange the HT superconductive tapes 110 of FIG. 5C in a desired shape than it would be to arrange the HT superconductive tapes 110 of FIG. 5A or 5B. For example, closed-loop coils can be formed in the HT superconductive tapes 110 of FIG. 5C without introducing edgewise stresses or twists in the HT superconductive tapes 110, as would be required to form similar closed-loop coils in the HT superconductive tapes 110 of FIG. 5A.

FIG. 5C illustrates four terminals as merely one example. In other examples, any number of additional terminals 102 can be added to the joint 100 of FIG. 5C by adjusting the geometry and arrangement of the terminals 102. Additionally, while FIG. 5C illustrates the terminals 102 as stacked vertically (e.g., one directly over another), in other implementations, one or more of the terminals 102 can be horizontally offset from one or more others of the terminals 102 to facilitate greater variety of bends and/or twists in the HT superconductive tapes 110 without interference from the joint 100.

Figure 6:
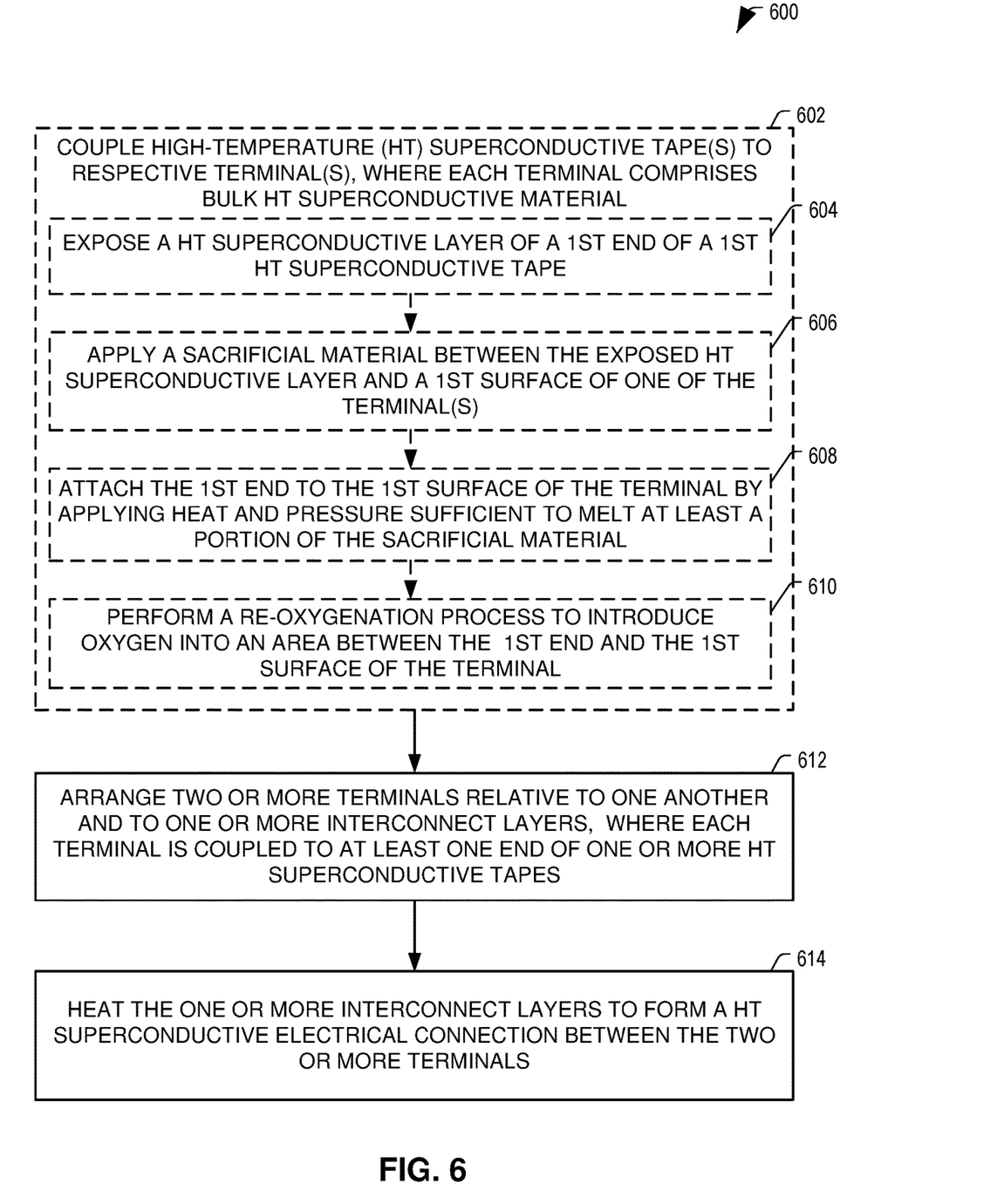
FIG. 6 is a diagram that illustrates a flow chart of an example of a method of forming a joint physically and electrically coupling ends of one or more high-temperature superconductive tapes together via terminals that include bulk high-temperature superconductive material.

FIG. 6 illustrates a flow chart of an example of a method 600 of forming a joint physically and electrically coupling ends of one or more high-temperature superconductive tapes together via terminals that include bulk high-temperature superconductive material. For example, the method 600 can be used to generate any of the joints 100 of any of FIGS. 1A-5C.

The method 600 optionally includes, at block 602, coupling HT superconductive tape(s) to respective terminal(s), where each terminal includes bulk HT superconductive material. For example, in a particular implementation, coupling the HT superconductive tape(s) to the respective terminal(s) includes, at block 604, exposing a HT superconductive layer of a first end of a first HT superconductive tape. In this implementation, coupling the HT superconductive tape(s) to the respective terminal(s) also includes, at block 606, applying a sacrificial material between the exposed HT superconductive layer and a first surface of one of the terminal(s), and, at block 608, attaching the first end to the first surface of the terminal by applying heat and pressure sufficient to melt at least a portion of the sacrificial material. In this implementation, coupling the HT superconductive tape(s) to the respective terminal(s) also includes, at block 610, performing a re-oxygenation process to introduce oxygen into an area between the first end and the first surface of the terminal. In other implementations, operations to couple the HT superconductive tape(s) to the respective terminal(s) are performed prior to the method 600 of FIG. 6. For example, HT superconductive tape(s) with previously attached terminal(s) can be purchased from a supplier, in which case each of the operations associated with block 602 of FIG. 6 can be omitted and the method 600 begins at block 612.

In a particular aspect, the method 600 includes, at block 612, arranging two or more terminals relative to one another and to one or more interconnect layers, where each terminal is coupled to at least one end of one or more HT superconductive tapes. For example, the terminals 102 can be arranged as illustrated in any of FIG. 1A, 1B, 5A, 5B, or 5C. To illustrate, in some implementations, the bulk HT superconductive material 104 of the terminals 102 exhibits anisotropic properties, and the terminals are arranged to in a manner that provides increased superconducting properties (relative to other arrangements of the terminals). As one example of such an arrangement, the bulk HT superconductive material 104 can exhibit an anisotropic critical current density such that a first critical current density is exhibited in a first plane parallel to the first surface of the first terminal and a second critical current density is exhibited along a direction perpendicular to the first plane, where the first critical current density is greater than the second critical current density. In this example, a desired critical current density can be achieved by arranging the two or more terminals such that ends of the one or more high-temperature superconductive tapes are configured for current flow along the first plane. FIGS. 1A, 5A, and 5B are examples of such arrangements of the terminals 102.

In some implementations, the terminals are arranged in a manner that provides improved (e.g., relative to other arrangements of the terminals) ease of positioning the HT superconducting tapes. FIGS. 1B and 5C are examples of such arrangements of the terminals 102.

The method 600 also includes, at block 614, heating the one or more interconnect layers to form a HT superconductive electrical connection between the two or more terminals. For example, heating the interconnect layer(s) 130 of any of FIG. 1A, 1B, 5A, 5B, or 5C can include directing one or more laser light sources toward the interconnect layer(s) 130. Generally, force is also applied to urge the terminals toward one another as heat is being applied. Sufficient heat may be applied to melt at least a portion of each of the interconnect layer(s) 130 without melting other material of a joint 100, such as materials of the terminals, materials of the HT superconductive tapes, and materials of a joints between the terminals and HT superconductive tapes. In some implementations, cooling is also provided to end regions of the HT superconducting tape(s) to inhibit formation of the joint between the terminals from affecting the connections between the terminals and the HT superconducting tapes.

One technical benefit of the method 600 is that it enables relatively simple formation of superconductive joints between superconductive components, such as ends of one or more HT superconductive tape(s) 110. The joint 100 can be formed, using the method 600 in a greater variety of processing conditions and environments. To illustrate, final operations to form the joint 100 (e.g., operations corresponding to blocks 612 and 614 of the method 600) can be performed "in the field", such as on a typical manufacturing line, rather than in a cleanroom. This improved ease of manufacturing enables use of HT superconducting joints in a larger variety of products and at a lower cost.

Particular aspects of the disclosure are described below in sets of interrelated Examples:

According to Example 1, a device includes a first terminal comprising a first bulk high-temperature superconductive material coupled to a first end of a high-temperature superconductive tape; a second terminal comprising a second bulk high-temperature superconductive material coupled to a second end of the high-temperature superconductive tape; and an interconnect layer configured to couple the first terminal and the second terminal to form a high-temperature superconductive electrical connection between the first terminal and the second terminal.

Example 2 includes the device of Example 1 and further includes a stator comprising one or more stator coils; and a rotor configured to rotate relative to the stator and comprising one or more rotor coils, wherein the one or more rotor coils include a first closed-loop coil defined by the high-temperature superconductive tape, the first terminal, the second terminal, and the interconnect layer.

Example 3 includes the device of Example 2 and further includes a flux pump to provide flux to establish and maintain a persistent current within the first closed-loop coil.

Example 4 includes the device of Example 2 or Example 3 and further includes a cooling system configured to cool the first closed-loop coil to a superconducting threshold temperature of one or more components of the first close-loop coil.

Example 5 includes the device of any of Examples 1 to 4 and further includes a third terminal comprising a third bulk high-temperature superconductive material and coupled to a first end of a second high-temperature superconductive tape; a fourth terminal comprising a fourth bulk high-temperature superconductive material and coupled to a second end of the second high-temperature superconductive tape; a second interconnect layer coupled to the third terminal and the fourth terminal to form a high-temperature superconductive electrical connection between the third terminal and the fourth terminal; and one or more third interconnect layers coupling the first and second terminals to the third and fourth terminals and forming a high-temperature superconductive electrical connection therebetween.

Example 6 includes the device of any of Examples 1 to 5, wherein the first bulk high-temperature superconductive material and the second bulk high-temperature superconductive material are the same material.

Example 7 includes the device of any of Examples 1 to 5, wherein the first bulk high-temperature superconductive material and the second bulk high-temperature superconductive material are different materials.

Example 8 includes the device of any of Examples 1 to 7, wherein the first end of the high-temperature superconductive tape is coupled to a first surface of the first terminal and the interconnect layer is coupled to a second surface of the first terminal, and wherein the first surface is adjacent to the second surface.

Example 9 includes the device of Example 8, wherein the first bulk high-temperature superconductive material exhibits anisotropic properties, including a first critical current density in a first plane parallel to the first surface of the first terminal and a second critical current density along a direction perpendicular to the first plane, and wherein the first critical current density is greater than the second critical current density.

Example 10 includes the device of any of Examples 1 to 7, wherein the first end of the high-temperature superconductive tape is coupled to a first surface of the first terminal and the interconnect layer is coupled to a second surface of the first terminal, and wherein the first surface is parallel to the second surface.

According to Example 11, a device includes a first terminal comprising a first bulk high-temperature superconductive material coupled to a first end of a first high-temperature superconductive tape; a second terminal comprising a second bulk high-temperature superconductive material coupled to a first end of a second high-temperature superconductive tape; and an interconnect layer configured to couple the first terminal and the second terminal to form a high-temperature superconductive electrical connection between the first terminal and the second terminal.

Example 12 includes the device of Example 11, wherein the first terminal, the first high-temperature superconductive tape, the second terminal, the second high-temperature superconductive tape, and the interconnect layer are integrated within a power transmission line.

Example 13 includes the device of Example 11, wherein the first terminal, the first high-temperature superconductive tape, the second terminal, the second high-temperature superconductive tape, and the interconnect layer are integrated within a first winding of a transformer.

Example 14 includes the device of any of Examples 11 to 13 and further includes one or more third terminals comprising one or more third bulk high-temperature superconductive materials, wherein each of the one or more third terminals is coupled to a respective first end of one or more third high-temperature superconductive tapes; and one or more second interconnect layers coupling the first and second terminals to the one or more third terminals and forming one or more high-temperature superconductive electrical connections therebetween.

Example 15 includes the device of any of Examples 11 to 14, wherein the first bulk high-temperature superconductive material and the second bulk high-temperature superconductive material are the same material.

Example 16 includes the device of any of Examples 11 to 14, wherein the first bulk high-temperature superconductive material and the second bulk high-temperature superconductive material are different materials.

Example 17 includes the device of any of Examples 11 to 16, wherein the first end of the first high-temperature superconductive tape is coupled to a first surface of the first terminal and the interconnect layer is coupled to a second surface of the first terminal, and wherein the first surface is adjacent to the second surface.

Example 18 includes the device of Example 17, wherein the first bulk high-temperature superconductive material exhibits anisotropic properties, including a first critical current density in a first plane parallel to the first surface of the first terminal and a second critical current density along a direction perpendicular to the first plane, and wherein the first critical current density is greater than the second critical current density.

Example 19 includes the device of any of Examples 11 to 16, wherein the first end of the first high-temperature superconductive tape is coupled to a first surface of the first terminal and the interconnect layer is coupled to a second surface of the first terminal, and wherein the first surface is parallel to the second surface.

According to Example 20, a method includes arranging two or more terminals relative to one another and to one or more interconnect layers, wherein each terminal comprises bulk high-temperature superconductive material and each terminal is coupled to at least one end of one or more high-temperature superconductive tapes; and heating the one or more interconnect layers to form a high-temperature superconductive electrical connection between the two or more terminals.

Example 21 includes the method of Example 20, wherein heating the one or more interconnect layers comprises directing one or more laser light sources toward the one or more interconnect layers.

Example 22 includes the method of Example 20 or Example 21 and further includes arranging the one or more high-temperature superconductive tapes to form one or more coils before arranging the two or more terminals relative to one another.

Example 23 includes the method of any of Examples 20 to 22, wherein the bulk high-temperature superconductive material exhibits anisotropic properties, including a first critical current density in a first plane parallel to a first surface of a first terminal of the two or more terminals and a second critical current density along a direction perpendicular to the first plane, wherein the first critical current density is greater than the second critical current density, and wherein arranging the two or more terminals relative to one another comprises arranging the two or more terminals such that ends of the one or more high-temperature superconductive tapes are configured for current flow along the first plane.

Example 24 includes the method of any of Examples 20 to 23 and further includes, before arranging the two or more terminals relative to one another, coupling at least one of the one or more high-temperature superconductive tapes to a respective one of the terminals by performing operations including at least: exposing a high-temperature superconductive layer of a first end of a first high-temperature superconductive tape of the one or more high-temperature superconductive tapes; applying a sacrificial material between the exposed high-temperature superconductive layer and a first surface of a first terminal of the one or more terminals; attaching the first end of the first high-temperature superconductive tape to the first surface of the first terminal by applying heat and pressure sufficient to melt at least a portion of the sacrificial material; and performing a re-oxygenation process to introduce oxygen into an area between the first end of the first high-temperature superconductive tape and the first surface of the first terminal.

Example 25 includes the method of any of Examples 20 to 24, wherein each of the one or more high-temperature superconductive tapes comprises a high-temperature superconductive layer with a peritectic temperature greater than or equal to a first value, material of an interface coupling each of the one or more high-temperature superconductive tapes to a respective terminal has a peritectic temperature greater than or equal to a second value, the bulk high-temperature superconductive material has a peritectic temperature greater than or equal to a third value, and each of the one or more interconnect layers has a peritectic temperature greater than or equal to a fourth value, wherein the fourth value is less than the first value, less than the second value, and less than the third value.

Example 26 includes the method of any of Examples 20 to 25, wherein heating the one or more interconnect layers to form the high-temperature superconductive electrical connection comprises applying heat sufficient to melt at least a portion of each of the one or more interconnect layers without melting material of joints between the two or more terminals and the one or more high-temperature superconductive tapes coupled thereto.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
   a first terminal comprising a first bulk high-temperature superconductive material coupled to a first end of a high-temperature superconductive tape;
   a second terminal comprising a second bulk high-temperature superconductive material coupled to a second end of the high-temperature superconductive tape; and
   an interconnect layer configured to couple the first terminal and the second terminal to form a high-temperature superconductive electrical connection between the first terminal and the second terminal.

2. The device of claim 1, further comprising:
   a stator comprising one or more stator coils; and
   a rotor configured to rotate relative to the stator and comprising one or more rotor coils, wherein the one or more rotor coils include a first closed-loop coil defined by the high-temperature superconductive tape, the first terminal, the second terminal, and the interconnect layer.

3. The device of claim 2, further comprising a flux pump to provide flux to establish and maintain a persistent current within the first closed-loop coil.

4. The device of claim 2, further comprising a cooling system configured to cool the first closed-loop coil to a superconducting threshold temperature of one or more components of the first closed-loop coil.

5. The device of claim 1, wherein the first bulk high-temperature superconductive material and the second bulk high-temperature superconductive material are the same material.

6. The device of claim 1, wherein the first bulk high-temperature superconductive material and the second bulk high-temperature superconductive material are different materials.

7. The device of claim 1, wherein the first end of the high-temperature superconductive tape is coupled to a first surface of the first terminal and the interconnect layer is coupled to a second surface of the first terminal, and wherein the first surface is adjacent to the second surface.

8. The device of claim 7, wherein the first bulk high-temperature superconductive material exhibits anisotropic properties, including a first critical current density in a first direction parallel to the first surface of the first terminal and a second critical current density along a second direction perpendicular to the first direction, and wherein the first critical current density is greater than the second critical current density.

9. The device of claim 1, wherein the first end of the high-temperature superconductive tape is coupled to a first surface of the first terminal and the interconnect layer is coupled to a second surface of the first terminal, and wherein the first surface is parallel to the second surface.

10. A device comprising:
    a first terminal comprising a first bulk high-temperature superconductive material coupled to a first end of a first high-temperature superconductive tape;
    a second terminal comprising a second bulk high-temperature superconductive material coupled to a first end of a second high-temperature superconductive tape; and
    an interconnect layer configured to couple the first terminal and the second terminal to form a high-temperature superconductive electrical connection between the first terminal and the second terminal.

11. The device of claim 10, wherein the first terminal, the first high-temperature superconductive tape, the second terminal, the second high-temperature superconductive tape, and the interconnect layer are integrated within a power transmission line.

12. The device of claim 10, wherein the first terminal, the first high-temperature superconductive tape, the second terminal, the second high-temperature superconductive tape, and the interconnect layer are integrated within a first winding of a transformer.

13. The device of claim 10, further comprising:
    one or more additional terminals comprising bulk high-temperature superconductive material, wherein each of the one or more additional terminals is coupled to a respective first end of one or more additional high-temperature superconductive tapes; and
    one or more additional interconnect layers coupling the first and second terminals to the one or more additional terminals and forming one or more high-temperature superconductive electrical connections therebetween.

14. The device of claim 10, wherein the first bulk high-temperature superconductive material and the second bulk high-temperature superconductive material are the same material.

15. The device of claim 10, wherein the first bulk high-temperature superconductive material and the second bulk high-temperature superconductive material are different materials.

16. The device of claim 10, wherein the first end of the first high-temperature superconductive tape is coupled to a first surface of the first terminal and the interconnect layer is coupled to a second surface of the first terminal, and wherein the first surface is adjacent to the second surface.

17. The device of claim 16, wherein the first bulk high-temperature superconductive material exhibits anisotropic properties, including a first critical current density in a first direction parallel to the first surface of the first terminal and a second critical current density along a second direction perpendicular to the first direction, and wherein the first critical current density is greater than the second critical current density.

18. The device of claim 10, wherein the first end of the first high-temperature superconductive tape is coupled to a first surface of the first terminal and the interconnect layer is coupled to a second surface of the first terminal, and wherein the first surface is parallel to the second surface.

19. A method comprising:
arranging two or more terminals relative to one another and to one or more interconnect layers, wherein each terminal comprises bulk high-temperature superconductive material and each terminal is coupled to at least one end of one or more high-temperature superconductive tapes; and
heating the one or more interconnect layers to form a high-temperature superconductive electrical connection between the two or more terminals.

20. The method of claim 19, further comprising arranging the one or more high-temperature superconductive tapes to form one or more coils before arranging the two or more terminals relative to one another.

21. The method of claim 19, further comprising, before arranging the two or more terminals relative to one another, coupling at least one of the one or more high-temperature superconductive tapes to a respective one of the terminals by performing operations including at least:
exposing a high-temperature superconductive layer of a first end of a first high-temperature superconductive tape of the one or more high-temperature superconductive tapes;
applying a sacrificial material between the exposed high-temperature superconductive layer and a first surface of a first terminal of the one or more terminals;
attaching the first end of the first high-temperature superconductive tape to the first surface of the first terminal by applying heat and pressure sufficient to melt at least a portion of the sacrificial material; and
performing a re-oxygenation process to introduce oxygen into an area between the first end of the first high-temperature superconductive tape and the first surface of the first terminal.

22. The method of claim 19, wherein:
each of the one or more high-temperature superconductive tapes comprises a high-temperature superconductive layer with a peritectic temperature greater than or equal to a first value;
material of an interface coupling each of the one or more high-temperature superconductive tapes to a respective terminal has a peritectic temperature greater than or equal to a second value;
the bulk high-temperature superconductive material has a peritectic temperature greater than or equal to a third value; and
each of the one or more interconnect layers has a peritectic temperature greater than or equal to a fourth value, and wherein the fourth value is less than the first value, less than the second value, and less than the third value.

* * * * *